US009129341B2

(12) United States Patent
Fraser

(10) Patent No.: US 9,129,341 B2
(45) Date of Patent: Sep. 8, 2015

(54) BETTING SYSTEM AND METHOD

(76) Inventor: Michael Grant Fraser, Maroubra (AU)

(*) Notice: Subject to any disclaimer, the term of this patent is extended or adjusted under 35 U.S.C. 154(b) by 1143 days.

(21) Appl. No.: 12/226,064

(22) PCT Filed: Apr. 5, 2007

(86) PCT No.: PCT/AU2007/000434
§ 371 (c)(1),
(2), (4) Date: Jul. 28, 2009

(87) PCT Pub. No.: WO2007/115356
PCT Pub. Date: Oct. 18, 2007

(65) Prior Publication Data

US 2010/0056237 A1 Mar. 4, 2010

(30) Foreign Application Priority Data

Apr. 7, 2006 (AU) ................................ 2006901829

(51) Int. Cl.
*A63F 9/00* (2006.01)
*A63F 13/00* (2014.01)
*G06F 17/00* (2006.01)
*G06F 19/00* (2011.01)
*G06Q 50/34* (2012.01)
*G07F 17/32* (2006.01)

(52) U.S. Cl.
CPC ................ *G06Q 50/34* (2013.01); *G07F 17/32* (2013.01); *G07F 17/3288* (2013.01)

(58) Field of Classification Search
CPC .................................................. G07F 17/3206
USPC ....................... 463/3, 16, 17, 6; 273/237, 246
See application file for complete search history.

(56) References Cited

U.S. PATENT DOCUMENTS 5,842,921 A 12/1998 Mindes et al.
6,394,898 B1 * 5/2002 Nagao et al. ....................... 463/6
7,354,343 B2 * 4/2008 Schugar et al. ................. 463/16
7,946,912 B1 * 5/2011 Rennard ......................... 463/17
2002/0073021 A1 6/2002 Ginsberg et al.

(Continued)

FOREIGN PATENT DOCUMENTS

JP 3-176771 7/1991
JP 10-334170 12/1998

(Continued)

OTHER PUBLICATIONS

Japanese Notification of Reasons for Rejection, dated Dec. 6, 2011 for Application No. 2009-503371, and English translation thereof.

(Continued)

*Primary Examiner* — Reginald Renwick
(74) *Attorney, Agent, or Firm* — Harness, Dickey & Pierce

(57) ABSTRACT

A method (100) and betting system (120) for a betting agency (102) to accept a bet (103) from a participant (101). The betting system (120) includes: the betting agency (102) receiving the bet (103) from the participant (101) wagering an amount in relation to one or more selected potential outcomes of an event (201); the betting agency (102) receiving from the participant (101), an indication of one or more modifications (290) to one or more parameters of the bet (103); and the betting agency (102) modifying the one or more parameters of the bet in accordance with the received indication (290) after commencement of the event (201) and prior to completion of the event

27 Claims, 7 Drawing Sheets

(56) References Cited

U.S. PATENT DOCUMENTS

| | | | | |
|---|---|---|---|---|
| 2004/0053686 | A1* | 3/2004 | Pacey et al. | 463/25 |
| 2004/0078208 | A1 | 4/2004 | Burwell | |
| 2004/0104845 | A1* | 6/2004 | McCarthy | 342/463 |
| 2004/0147312 | A1 | 7/2004 | Aronson et al. | |
| 2004/0204216 | A1* | 10/2004 | Schugar | 463/16 |
| 2005/0288081 | A1* | 12/2005 | Amaitis et al. | 463/6 |
| 2006/0009281 | A1 | 1/2006 | Stonach | |
| 2006/0025208 | A1 | 2/2006 | Ramsey | |
| 2008/0139277 | A1* | 6/2008 | Okada | 463/17 |
| 2009/0227316 | A1* | 9/2009 | Grubmuller | 463/17 |

FOREIGN PATENT DOCUMENTS

| | | | |
|---|---|---|---|
| JP | 2002-133007 | | 5/2002 |
| JP | 2002133011 | A | 5/2002 |
| JP | 2004-157011 | | 6/2004 |
| JP | 2005-322151 | | 11/2005 |
| JP | 2008513850 | A | 5/2008 |
| KR | 20020087623 | A | 11/2002 |
| WO | WO-2006004767 | A2 | 1/2006 |

OTHER PUBLICATIONS

Japanese Examination Report dated Oct. 16, 2012 for corresponding Japanese Application No. 2009-503371 (full translation provided).

European Search Report dated Apr. 5, 2013 for corresponding European Application No. 07718681.5.

European Search Report dated Jul. 5, 2012 for corresponding European Patent Application No. 07718681.5.

* cited by examiner

BETTING SYSTEM AND METHOD

BACKGROUND OF THE INVENTION

The present invention relates to a method and system for placing a bet with a betting agency. In one form, the present invention relates to placing a bet in relation to objects in a competition.

DESCRIPTION OF THE PRIOR ART

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Currently a participant, or punter, can place a bet in relation to a potential outcome of an event with a betting agency. Unfortunately, the participant and the betting agency are only able to solely consider past performances of an object from other events to determine which potential outcome to place a bet upon.

Generally, the participant finalises parameters of the bet, such as the amount wagered on a selected potential outcome, prior to the commencement of the event. The finalisation of the parameters are unfortunately selected by the participant generally based only on past performances of an object in other completed events.

The present invention seeks to alleviate one or more of the above disadvantages, or at least provide a useful alternative to the above methods and systems.

SUMMARY OF THE INVENTION

In one broad form, the present invention provides a method for a betting agency to accept a bet from a participant, wherein the betting agency is associated with a data processing system, wherein the data processing system is configured to perform the steps of:

receiving a bet from the participant wagering an amount in relation to one or more selected potential outcomes of an event;

receiving, from the participant, an indication of one or more modifications to one or more parameters of the bet; and modifying the one or more parameters of the bet in accordance with the received indication after commencement of the event and prior to completion of the event.

Optionally, the step of modifying the one or more parameters of the bet includes at least one of:

refining the one or more selected potential outcomes of the bet; and redistributing at least some of the amount wagered in relation to at least one of the selected potential outcomes.

Optionally, the step of refining the one or more selected potential outcomes includes reducing the number of the one or more selected potential outcomes.

In another particular, but non-limiting, form, the method includes the participant:

receiving, after the commencement and prior to the completion of the event, event data indicative of the progress of the event; and modifying, in accordance with the event data, the parameters of the bet.

In accordance with a specific optional embodiment, the method includes the participant selecting the amount to be wagered from an account system.

Optionally, the method includes the participant accessing the account using:

an identity; and at least one of:

a password; and a signature of the participant.

Optionally, the event is a race including competing objects, wherein the method includes receiving the one or more selected potential outcomes for the race including at least one of:

an object that places first in the race;

three objects in any order that place first, second and third in the race;

two objects that place first and second in the race;

a first object that finishes first in the race; a second object that finishes second in the race; and a third object that finishes third in the race; and selecting where an object finishes in the race.

According to another non-limiting embodiment, the method includes the participant selecting a combination of outcomes of the event.

Optionally, the method includes modifying the one or more parameters:

between two points of time whilst the event is in progress;

before a point in time whilst the event is in progress;

before or after a predetermined distance has been completed by an object in an event, whilst the event is in progress; and/or before or after an indicative point related to the nature of the event in progress.

Optionally, the step of receiving the indication of the one or more modifications to the one or more parameters of the bet occurs prior to the commencement of the event, or after commencement and prior to the completion of the event.

In another non-limiting embodiment, the method includes the participant placing the bet using at least one of:

a processing system, wherein the processing system transfers betting data to the data processing system; and a betting form, wherein the betting form is processed by the betting agency.

Optionally, the method includes the participant using the at least one of:

the processing system to modify the parameters of the bet, wherein the processing system transfers modified parameter data to the data processing system;

the betting form to modify the parameters of the bet, wherein the betting form is processed by the betting agency; and, a second form to modify the parameters of the bet, wherein the second betting form is processed by the betting agency.

In one particular, but non-limiting, form, the method includes the participant receiving a receipt for at least one of:

placing the bet; and modifying the parameters of the bet.

Optionally, the receipt includes an identity of the bet, and wherein the method includes the participant using the identity of the bet to modify the parameters of the bet.

In another non-limiting embodiment, the method includes defining one or more rules for determining if the parameters of the bet should be modified in accordance with the event data.

In another broad form, the present invention provides a data processing system configured to accept a bet from a participant, wherein the data processing system is associated with a betting agency, wherein the data processing system is configured to:

receive a bet from the participant wagering an amount in relation to one or more selected potential outcomes of an event;

receive, from the participant, an indication of one or more modifications to one or more parameters of the bet; and modify the one or more parameters of the bet in accordance with the received indication after commencement of the event and prior to completion of the event.

Optionally, in order to modify the parameters, the data processing system is configured to:

refine the one or more selected potential outcomes of the bet; and redistribute at least some of the amount wagered in relation to at least one of the selected potential outcomes.

Optionally, in order to refine the selected potential outcomes, the data processing system is configured to reduce the number of selected potential outcomes.

Optionally, the event is a race including competing objects, wherein the data processing system is configured to receive the selected potential outcomes for the race including at least one of:

an object that places first in the race;

three objects in any order that place first, second and third in the race;

two objects that place first and second in the race;

a first object that finishes first in the race; a second object that finishes second in the race; and a third object that finishes third in the race; and selecting where an object finishes in the race.

Optionally, the data processing system is configured to modify the parameters:

between two points of time whilst the event is in progress;

before a point in time whilst the event is in progress;

before or after a predetermined distance has been completed by an object in an event, whilst the event is in progress; and/or before or after an indicative point related to the nature of the event in progress.

Optionally, the data processing system is configured to receive the indication of the one or more modifications to the one or more parameters of the bet prior to the commencement of the event, or after commencement and prior to the completion of the event.

In another broad form the present invention provides a method for a data presentation system to display event data indicative of an event in progress to a participant of a bet wagered with a betting agency, wherein the event data is used by a participant for modifying parameters of the bet with the betting agency after the commencement and prior to the completion of the event, the method including the steps of:

receiving, in the data presentation system, the event data; and, presenting, using the data presentation system, the event data to the participant, such that the participant can modify the parameters of the bet with the betting agency in accordance with the event data.

Preferably, but not necessarily, the method includes the data presentation system receiving and presenting event data indicative of at least one of:

real time data of the event in progress;

betting odds offered by the betting agency for one or more potential outcomes to the event;

time remaining before the commencement of the event;

time left before the completion of the event;

time left to modify the parameters of the bet;

streaming video of the event in progress;

streaming audio of the event in progress;

graphical simulation of the event in progress; and, any other data indicative of the event in progress.

Also preferably, but not necessarily, the method includes the data presentation system selecting, according to an availability of one or more output interfaces of the data presentation system, an output medium which the event data is to be presented to the participant.

In particular, but non-limiting, forms, the method includes at least one of the data presentation system:

formatting the event data received in accordance with the output medium selected;

manipulating the event data received in accordance with the output medium selected; and modifying the event data received in accordance with the output medium selected.

In another particular, but non-limiting, form, the method includes configuring the data presentation system to present a subset of the event data.

In accordance with a specific optional embodiment, the data presentation system includes a means to modify the parameters of the bet, and wherein the method includes modifying the parameters of the bet using the means to modify the parameters of the bet with the betting agency.

Optionally, the data presentation system includes a means to transfer modified parameter data, wherein the method includes transferring, using the means to transfer modified data, the modified parameter data to the betting agency.

In another broad form the present invention provides a data presentation system for displaying event data indicative of an event in progress to a participant of a bet wagered with a betting agency, wherein the event data is used by a participant for modifying parameters of the bet with the betting agency after the commencement and prior to the completion of the event, the data presentation system including:

a means to receive the event data; and, a means to present the event data to the participant, such that the participant can modify the parameters of the bet with the betting agency in accordance with the event data.

In another broad form, the present invention provides a method of providing event data indicative of an event in progress to a participant that has placed a bet with a betting agency prior to the commencement of the event, wherein the method includes the steps of:

receiving, from objects competing in the event and whilst the event is in progress, object data indicative of an object's performance in the event;

generating, using the object data, event data indicative of the progress of the event; and transferring the event data to a data presentation system, such that the event data can be presented whilst the event is in progress to the participant to allow the participant to modify parameters of the bet with the betting agency prior to the completion of the event.

Preferably, but not necessarily, prior to receiving the object data, the method includes transferring, to the objects competing in the event, request data indicative of a request for the object data.

Also preferably, but not necessarily, the method includes:

modifying, in accordance with the object data received from the objects, a set of odds for potential outcomes of the event in progress; and transferring, to the data presentation system, the set of odds, such that the set of odds can be presented by the data presentation system to the participant.

In particular, but non-limiting, forms, the method includes encrypting the event data prior to transferring the event data to the data presentation system.

In another particular, but non-limiting, form, the object data received from the objects is encrypted, and wherein the method includes, decrypting the object data.

In accordance with a specific optional embodiment, the method includes using a transmitter to transfer at least one of:

the event data; and the request data.

Optionally, the method includes using a receiver to receive the object data.

According to one embodiment, modifying the set of odds includes modifying an initial set of odds provided to the participant when the bet is placed with the betting agency.

According to another non-limiting embodiment, modifying the initial set of odds is based upon at least one of:

the object data;

the amount wagered by other participants with the betting agency;

past event data indicative of one or more past events;

past object data indicative of one or more performances by one or more objects; and a profit margin for the betting agency.

Optionally, the method includes generating request data indicative of measurement types which are to be measured.

In another broad form, the present invention provides a data processing system for providing event data indicative of an event in progress to a participant that has placed a bet with a betting agency prior to the commencement of the event, wherein the data processing system includes:

a means to receive, from objects competing in the event and whilst the event is in progress, object data indicative of an object's performance in the event;

a means to generate, using the object data, event data indicative of the progress of the event; and a means to transfer the event data to a data presentation system, such that the event data can be presented whilst the event is in progress to the participant to allow the participant to modify parameters of the bet with the betting agency prior to the completion of the event.

In another broad form, the present invention provides a method of measuring object data indicative of an object's performance competing in an event in progress, wherein the method includes:

receiving a request for object data to be measured;

measuring, whilst the event is in progress, the object data; and transferring, to a data collection system, the object data.

Preferably, but not necessarily, the method includes receiving a periodic request for object data.

Also preferably, but not necessarily, the method includes generating the object data which is indicative of at least one of:

a location or place of the object in the event;

a velocity of the object in the event;

a time of completion of a distance of the event;

an acceleration of the object of the event;

weather conditions of the event;

a time between the object and another competing object in the event; and a distance between the object and another competing object in the event.

In particular, but non-limiting, forms, the method includes transmitting the object data using a wireless communication network.

In another particular, but non-limiting, form, the objects are competing horses and the event is a horse race.

In accordance with a specific optional embodiment, request data is indicative of measurement types to be measured by the device, wherein the method includes measuring object data in accordance with the measurement types.

In another broad form the present invention provides a measurement device which is associated with an object competing in an event in progress, wherein the measurement device measures object data indicative of an object's performance whilst the event is in progress, wherein the measurement device includes:

a means to receive a request for object data to be measured;

a means to measure, whilst the event is in progress, the object data; and a means to transfer, to a data collection system, the object data.

Preferably, but not necessarily, the measurement device is carried with the object whilst the object is competing in the event.

Also preferably, but not necessarily, the competing objects are horses and the event is a horse race, and wherein the measurement device is carried with the horse competing in the horse riding event.

In particular, but non-limiting, forms, the measurement device is included in a cap of a jockey riding the horse in the horse racing event.

In another particular, but non-limiting, form, the measurement device is included in a bridle of the horse in the horse racing event.

In accordance with a specific optional embodiment, the request data is indicative of measurement types to be measured by the measurement device, wherein the measurement device measures object data in accordance with the measurement types.

In another broad form, the present invention provides a system for a betting agency to accept a bet from a participant in regard to an event having a plurality of competing objects, wherein the system includes:

one or more measurement devices configured to:

measure the performance of the competing objects in the event;

generate object data indicative of the competing objects performance; and transfer the object data; and a data processing system associated with the betting agency, wherein the data processing system is configured to:

receive the bet from the participant wagering an amount in relation to one or more selected potential outcomes of an event;

receive object data from the one or more measurement devices;

calculate, based at least partially upon the received object data, modified betting odds for the one or more potential outcomes during the event;

receive, from the participant, an indication of one or more modifications to one or more parameters of the bet; and modify the one or more parameters of the bet in accordance with the received indication and the modified betting odds after commencement of the event and prior to completion of the event.

Optionally, the one or more measurement devices are configured to generate the object data indicative of at least one of:

a location or place of the object in the event;

a velocity of the object in the event;

a time of completion of a distance of the event;

an acceleration of the object of the event;

weather conditions of the event;

a time between the object and another competing object in the event; and a distance between the object and another competing object in the event.

Optionally, the system includes a plurality of surface-positioned devices, wherein each surface-defining device is configured to receive the object data from one or more measurement devices; and transfer the object data to the data processing system.

Optionally, the data processing system is configured to calculate the modified betting odds based at least partially upon at least one of:

the amount wagered by other participants with the betting agency;

past event data indicative of one or more past events;

past object data indicative of one or more performances by one or more objects; and a profit margin for the betting agency.

Optionally, the system includes a participant processing system in data communication with the data processing system, wherein the participant processing system is configured to receive, from the participant, input data indicative of the indication of the one or more modifications to one or more parameters of the bet; and transfer the input data to the data processing system.

Optionally, the system includes a plurality of measurement devices, each measurement device provided in the form of a transmitter, wherein the event is a horse racing event and wherein each transmitter is provided in the form of a bridle which is associated with a respective horse in the race.

In another broad form, the present invention provides a method for a betting agency to accept a bet from a participant, wherein the method includes the steps of:

receiving the bet from the participant wagering an amount in relation to one or more selected potential outcomes of an event;

receiving, from the participant, an indication of one or more modifications to one or more parameters of the bet; and modifying the one or more parameters of the bet in accordance with the received indication after commencement of the event and prior to completion of the event.

In another broad form the present invention provides a system for a betting agency to accept a bet from a participant, wherein the system is configured to:

receive the bet from the participant wagering an amount in relation to one or more selected potential outcomes of an event;

receive, from the participant, an indication of one or more modifications to one or more parameters of the bet; and receive the one or more parameters of the bet in accordance with the received indication after commencement of the event and prior to completion of the event.

In another broad form the present invention provides a method for a participant to bet with a betting agency, wherein the method includes the participant performing the steps of:

placing a bet with the betting agency by wagering an amount in relation to selected potential outcomes of an event, wherein the bet is placed with the betting agency prior to the commencement of the event; and modifying or finalising parameters of the bet with the betting agency after the commencement of the event and prior to the completion of the event.

BRIEF DESCRIPTION OF THE DRAWINGS

An example embodiment of the present invention should become apparent from the following description, which is given by way of example only, of a preferred but non-limiting embodiment, described in connection with the accompanying figures.

DETAILED DESCRIPTION OF THE PREFERRED EMBODIMENTS

Throughout the drawings, like numerals will be used to identify similar features, except where expressly otherwise indicated.

Figure 1A:
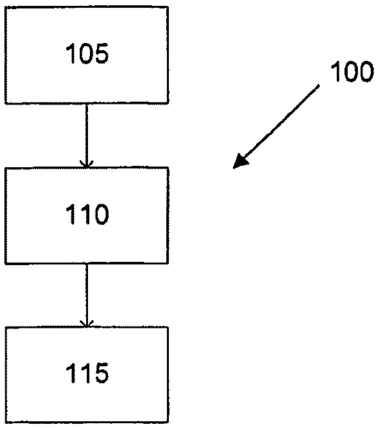
FIG. 1A shows an example of a method for a betting agency to accept a bet from a participant.

FIG. 1A shows an example of a method 100 for a betting agency 102 to accept a bet from a participant 101. In particular, at step 105, the method 100 includes receiving the bet from the participant 101 wagering an amount in relation to one or more selected potential outcomes of an event. At step 110, the method 100 includes receiving, from the participant 101, an indication of one or more modifications to one or more parameters of the bet. At step 115, the method 100 includes modifying the one or more parameters of the bet in accordance with the received indication after commencement of the event and prior to completion of the event.

Figure 1B:
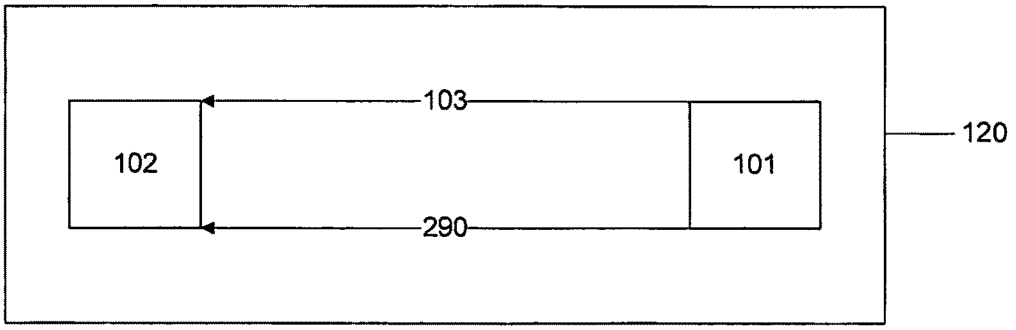
FIG. 1B shows an example system for a betting agency to accept a bet from a participant.

FIG. 1B shows an example betting system 120 for a betting agency 102 to accept a bet from a participant 101. In particular, the betting system 120 is configured to: receive the bet from the participant 101 wagering an amount in relation to one or more selected potential outcomes of an event; receive, from the participant 101, an indication of one or more modifications to one or more parameters of the bet; and modify the one or more parameters of the bet in accordance with the received indication after commencement of the event and prior to completion of the event.

Figure 1C:
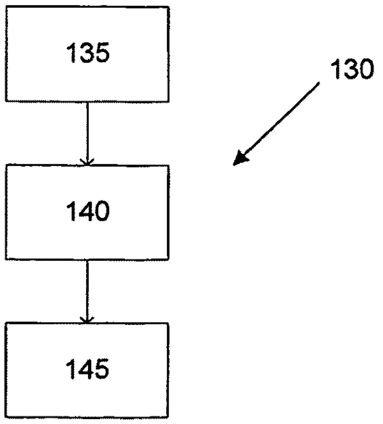
FIG. 1C shows another example method for a betting agency to accept a bet from a participant.

FIG. 1C shows another example of a method 130 for a betting agency 102 to accept a bet from a participant 101. In particular, at step 135 the method 130 includes a data processing system 150 associated with the betting agency 102 receiving a bet from the participant wagering an amount in relation to one or more selected potential outcomes of an event. At step 140, the method 130 includes the data processing system 150 receiving, from the participant 101, an indication of one or more modifications to one or more parameters of the bet. At step 145, the method 130 includes the data processing system 150 modifying the one or more parameters of the bet in accordance with the received indication after commencement of the event and prior to completion of the event.

Figure 1D:
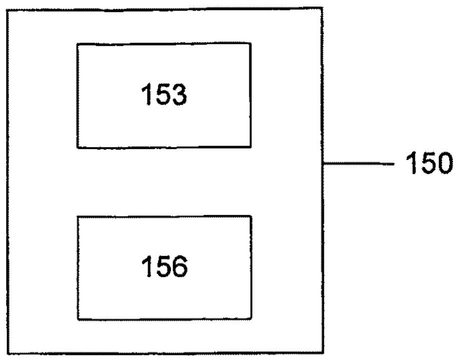
FIG. 1D shows an example of a data processing system for accepting a bet from a participant.

FIG. 1D shows an example of the data processing system 150. The data processing system 150 includes a receiving module 153 and a modification module 156. The receiving module 153 is configured to: receive a bet from the participant 101 wagering an amount in relation to one or more selected potential outcomes of an event; and receive, from the participant 101, an indication of one or more modifications to one or more parameters of the bet. The modification module 156 is configured to modify the one or more parameters of the bet in accordance with the received indication after commencement of the event and prior to completion of the event.

Figure 1E:
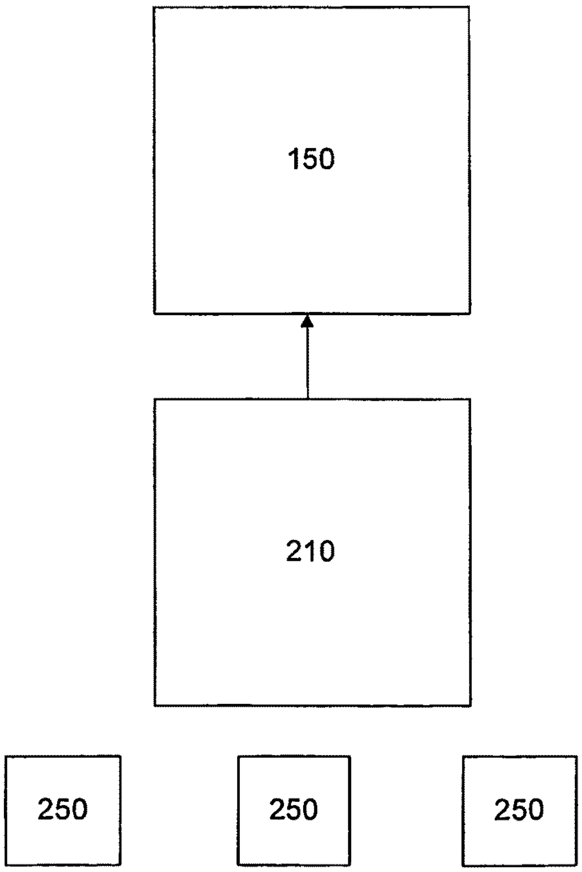
FIG. 1E shows an example system for a betting agency to accept a bet from a participant.

FIG. 1E shows an example of a system 160 for a betting agency 102 to accept a bet from a participant in regard to an event having a plurality of competing objects 250. In particular the system 160 includes one or more measurement devices 210 and a data processing system 150 associated with the betting agency 102. The one or more measurement devices 210 are configured to: measure objects 250 performance in the event; generate object data indicative of the objects 250 performance; and transfer the object data to the data processing system 150.

The data processing system 150 is configured to: receive the bet from the participant 101 wagering an amount in relation to one or more selected potential outcomes of an event; receive object data from the one or more measurement devices 210 associated with the objects 250; calculate, based at least partially upon the received object data, modified betting odds for the one or more potential outcomes during the event; receive, from the participant 101, an indication of one or more modifications to one or more parameters of the bet; and modify the one or more parameters of the bet in accordance with the received indication and the modified betting odds after commencement of the event and prior to completion of the event.

Figure 1F:
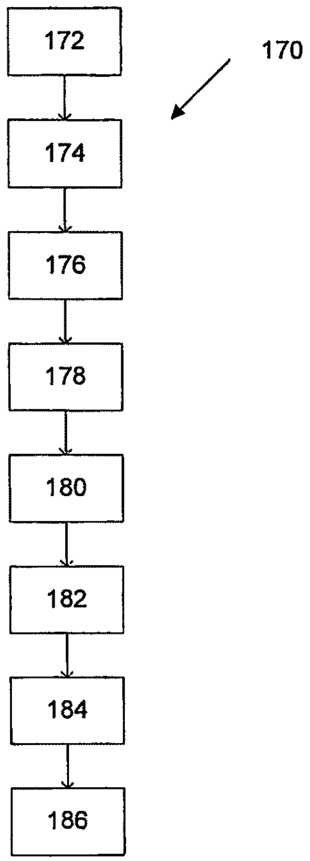
FIG. 1F shows an example method for a betting agency to accept a bet from a participant.

FIG. 1F shows an example method 170 performed by the system 160. In particular, at step 172, the method 170 includes the data processing system 150 receiving the bet from the participant 101 wagering an amount in relation to one or more selected potential outcomes of an event. At step 174, the method 170 includes the one or more measurement devices measuring the objects 250 performance in the event. At step 176, the method 170 includes the one or more measurement devices generating object data indicative of the objects 250 performance. At step 178, the method 170 includes the one or more measurement devices 210 transferring the object data to the data processing system 150.

At step 180, the method includes the data processing system 150 receiving the object data from the one or more measurement devices 210. At step 182, the method 170 includes the data processing system 150 calculating, based at least partially upon the received object data, modified betting odds for the one or more potential outcomes during the event. At step 184, the method 170 includes the data processing system 150 receiving, from the participant 101, an indication of one or more modifications to one or more parameters of the bet. At step 186, the method 170 includes modifying the one or more parameters of the bet in accordance with the received indication and the modified betting odds after commencement of the event and prior to completion of the event.

The above described methods and systems advantageously allow the participant 101 to configure the bet such that one or more parameters are modified during the progress of the event. In one form, the participant can advantageously provide an indication during the event of the parameters of the bet to modify. In an additional or alternate form, the bet may be configured such that participant advantageously indicates the one or more parameters of the bet which can be automatically modified during the event without the participant having to provide the indication during the event.

Figure 2A:
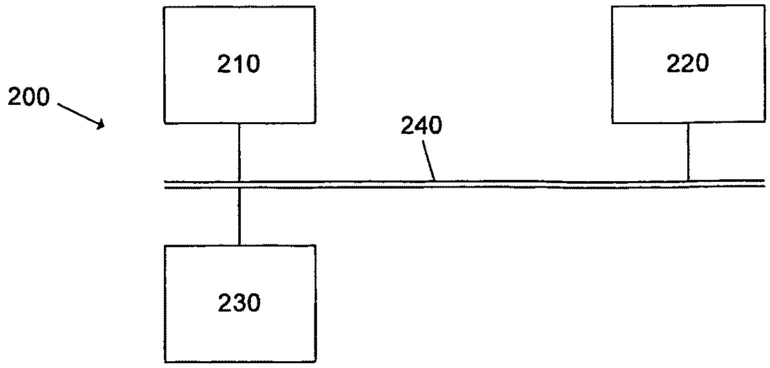
FIG. 2A shows a further example of a system allowing a participant to place a bet with a betting agency.

FIG. 2A shows an example of a betting system 200 which allows a participant 101 to place a bet with a betting agency 102.

In particular, the betting system 200 includes one or more measurement devices 210 to measure the performance of the objects in the event; one or more data processing systems 220 configured receive the bet from the participant and to receive the object data from the one or more measurement devices; one or more data presentation systems 230 for presenting event data indicative of the event in progress; and one or more communication networks 240 providing a data link between the above components 210, 220, 230 of the betting system 200.

Figure 2B:
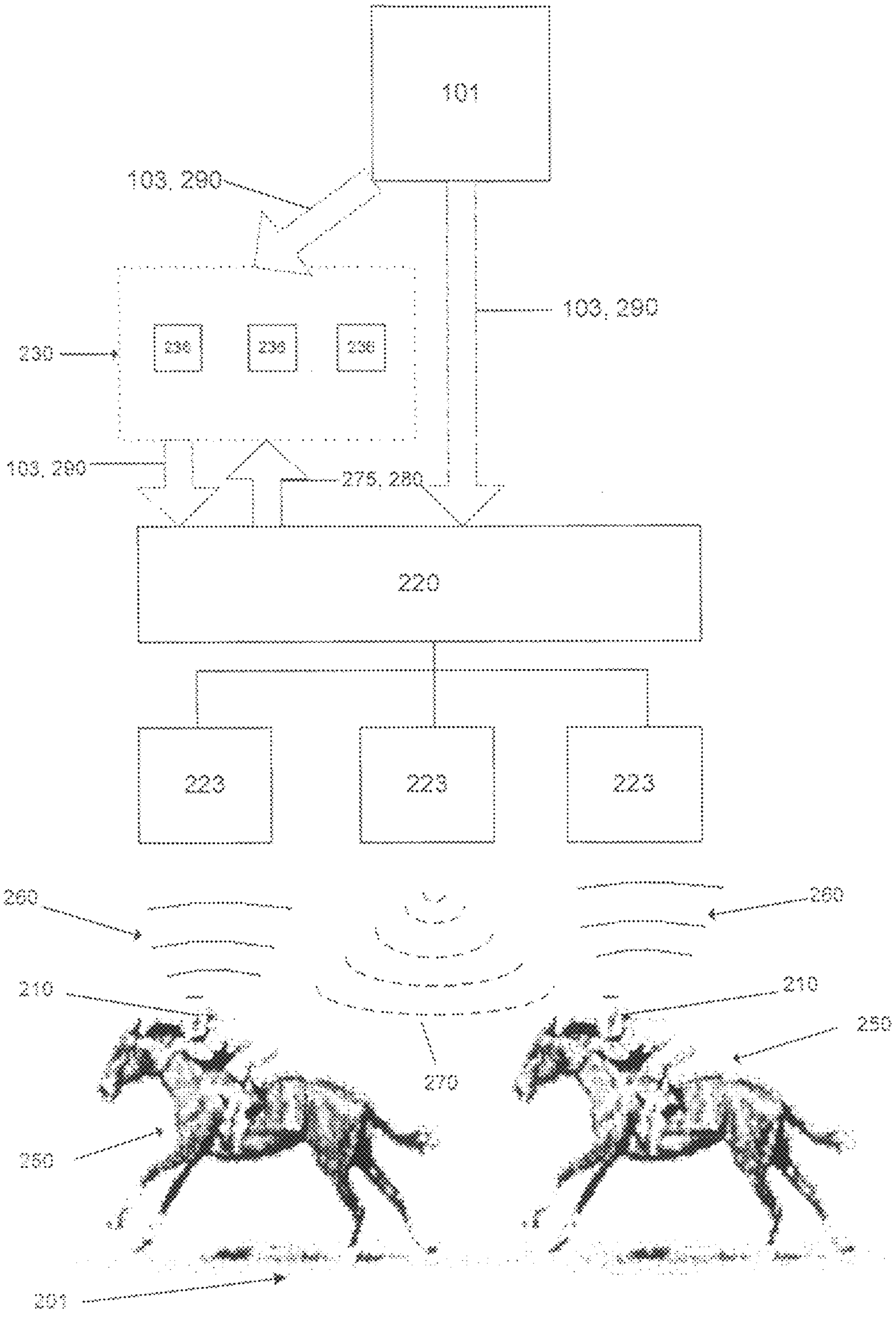
FIG. 2B shows a more detailed example of the system illustrated in FIG. 2A.

FIG. 2B shows a more detailed example of a betting system 200 which allows a participant 101 to place a bet with a betting agency 102.

In particular, FIG. 2B shows the participant 101 placing the bet with the betting agency 102, where betting data 103 indicative of the amount to be wagered and the selected potential outcomes is received, from the participant 101, by betting agency 102. The participant 101 may manually place the bet with the betting agency 102, such as using a betting form, or may optionally use a data presentation system 230 to transfer the betting data 103 to the betting agency 102.

After the event starts, request data 270 is optionally (indicated by the broken line) transferred from transceivers 223 of the data processing system 220 to the measurement devices 210 associated with the competing objects 250 in the event 201, which in this example are competing horses in a horse race.

The measurement devices 210 measure object data 260 and transfer the object data 260 to the transceivers 223 of the data processing system 220. The data processing system 220 generates event data 275 using the object data 260, and the betting agency 102 uses the event data 275 to modify an initial set of odds. The event data 275 and optionally the modified set of odds 280 are then transferred to the data presentation system 230, which are then presented to the participant 101 using one or more output devices 236. The participant 101 then transfers modified parameters 290 of the bet to the betting agency 102. The modified parameters 290 may be transferred directly to the betting agency 102, such as using a betting form, or indirectly via the data presentation system 230, as shown in FIG. 2B.

Figure 3:
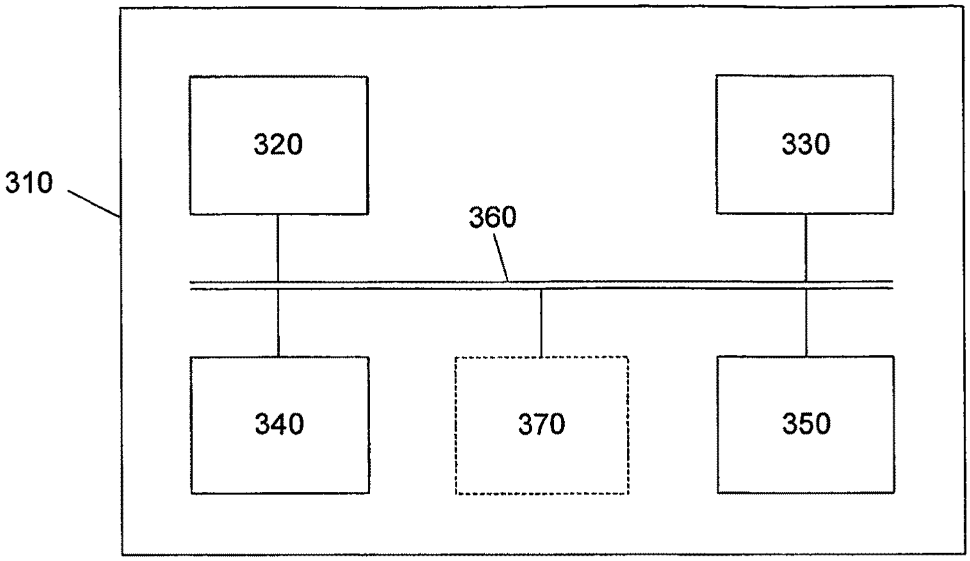
FIG. 3 shows an example of a processing system.

FIG. 3 shows an example of a processing system 310 suitable for the measurement device 210, the data processing system 220, and/or the data presentation system 230. In particular, the processing system 310 generally includes at least a processor 320, optionally a memory 321, optionally an input device 322, such as a keyboard, optionally an output device 323, such as a display, coupled together via a bus 324 as shown. An optional external interface may be also provided. The processing system 310 is capable of executing computer software designed for placing a bet with a betting agency and modifying parameters of the bet during the progress of the event.

Accordingly, it will be appreciated that the processing system 310 may be any form of processing system 310 suitably programmed to perform the method, as will be described in more detail below. The processing system 310 may therefore be a suitably programmed computer, laptop, palm computer, network or web server, data logger or the like. Alternatively, specialised hardware or the like may be used.

In any event, it will be appreciated that suitable computer software in the form of computer executable software may be used in order to perform the methods described herein.

Figure 4A:
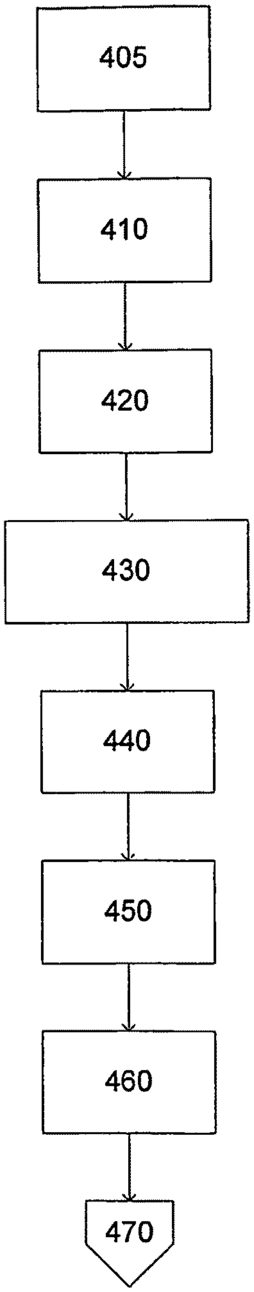
FIGS. 4A and 4B show a more detailed example of the methods illustrated in FIGS. 1A, 1C and 1F.
Figure 4B:
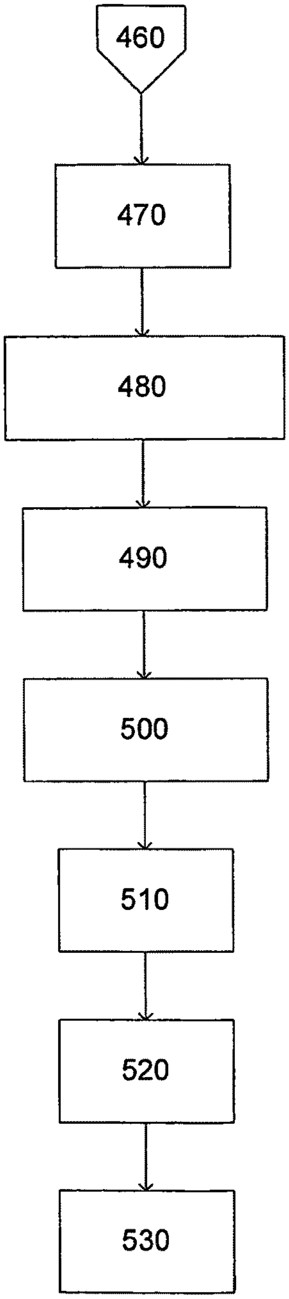

FIGS. 4A and 4B show a more detailed example of a method for a participant 101 to place a bet with a betting agency 102.

In particular, at step 400, the participant 101 wagers an amount in relation to selected potential outcomes of an event with the betting agency 102 prior to the commencement of the event. In one form, the participant 101 uses data presentation system 230 to select an amount to wager and the potential outcomes of the event in relation to the bet. Once the selection has been performed by the participant 101, the data presentation system transfers betting data 103 indicative of the amount wagered and selected potential outcomes to the betting agency 102.

The bet placed with the betting agency 102 is in regard to an initial set of odds offered by the betting agency 102 for the selected potential outcomes prior to the commencement of the event 201. The initial set of odds offered by the betting agency 102 may be presented to the participant 101 using the data presentation system 230. However, other means may be used such as newspapers and the like.

At step 410, the participant 101 generally receives a receipt for placing the bet. The receipt may be a physical receipt, such as a paper receipt, or the receipt may be a digital receipt indicative of the bet that has been placed by the participant 101 with the betting agency 102. The receipt may be include an identity of the bet, where the participant 101 may later use the identity of the bet to modify the parameters of the bet, as discussed in further detail.

At step 420, the event begins. No more bets can be placed after this point in time. However, due to the nature of this form of betting, the participant 101 may finalise and/or modify the parameters of the bet during the progress of the event 201.

At step 430, the data processing system 220 transfers, to measurement device associated with the objects 250 competing in the event 201, request data 270 indicative of a request for object data 260 indicative of the performance of the object 205 in the event 201 in progress.

The request data 270 is generally indicative of specific object measurements which the data processing system 220 requires. For example, in one example the request data 270 may be indicative of a request for the velocity of the object 250 in the event 201, and the acceleration of the object 250 in the event 201. In another example, the request data 270 may be indicative of a request for a location of the object 250, a place of the object 250 relative to other competing objects 250 in the event 201, and the velocity of the object 250 in the event 201. The request data 270 may be generated by the data processing system 220. In one form, the participant 101 may select the specific object measurements to be measured, and the data processing system 220 generates the request data 270 based on the participant's selection. Alternatively, one or more predefined measurements may measured by the measurement devices regarding the performance of the objects in the progress event. In this case, the request is a prompt to measure the progress of the event.

The data processing system 220 transfers the request data 270 to measurement devices 210 associated with the objects 250 using one or more transmitters 223. The transmitter 223 preferably transmits the request data 270 using wireless communication network, such as utilising radio frequency transmission.

At step 440, the measurement devices 210 initiate the measurement of the object data 260, in response to the request data 270, whilst the event 201 is in progress. The object data 260 measured may be indicative of at least one of a location or place of the object 250 in the event 201, a velocity of the object 250 in the event 201, a time of completion of a distance for the object 250 in the event 201, an acceleration of the object 201 in the event 201, weather conditions of the event 201, a distance or time between one object 250 and one or more other objects 250 in the event 201, and any other measurements which are indicative of the performance of the objects 250 in the event 201 in progress. It is possible that object data 260 may be generated by the measurement device 210 using at least some of the measurements. For example, a series of time-stamped locations of the object 250 during the event 201 may be used to generate a velocity of the object 250.

At step 450, the object data 260 is transferred from the measurement devices 210 to the data processing system 220. Again, this step preferably utilises a wireless communication network to transfer the object data from the measurement devices to the data processing system. The data processing system may use the receivers or transceivers 223 to receive the object data from the measurement devices 210.

At step 460, the data processing system 220 generates event data 275 using the object data 260 received from the measurement devices 210. Therefore, object data 260 indicative of the performance of different objects 250 in the event 201 are used to generate or are combined to form the event data 275 which is indicative of the progress of the event 201.

At step 470, the betting agency 102 modifies, in accordance with at least the event data 275, the initial set of odds for potential outcomes of the event 201 in progress. This modification to the initial set of odds offered to the participant 101 by the betting agency 102 may be based upon additional factors other than the performance of the competing objects which may include at least one of the amount wagered by other participants 101 with the betting agency 102, past event data 275 indicative of one or more past events 201, past object data 260 indicative of one or more performances by one or more objects 250, and a profit margin for the betting agency 102. In a preferable form, the betting agency 102 configures the data processing system 220 to modify the initial set of odds to generate the modified set of odds 280.

At step 480, the betting agency 102, generally using the data processing system 220, transfers the event data 275 to the data presentation system 230. The data processing system 220 may optionally transfer the modified set of odds with the event data 275 to the data presentation system 230 at particular points of time throughout the progress of the event 201. This transfer of data 275, 280 from the data processing system 220 to the data presentation system 230 uses the communication network 150.

At step 490, the data presentation system 230 presents the event data 275, and if available, the modified set of odds 280, to the participant 101, such that the participant 101 can assess this data 275, 280 such as to allow the participant 101 to modify the parameters of the bet with the betting agency 102.

The event data 275 presented using the data presentation system may be indicative of at least one of real time data of the event 201 in progress, time left before the completion of the event 201, time left to modify the parameters of the bet, streaming video of the event 201 in progress, streaming audio of the event 201 in progress, graphical simulation of the event 201 in progress, and any other data indicative of the event 201 in progress.

At step 500, the participant 101 modifies the parameters of the bet with the betting agency 102 after the commencement of the event 201 and prior to the completion of the event 201. The parameters of the bet which the participant may modify include the amount wagered on one or more potential outcomes, and the potential outcomes of the event 201 which the bet has been placed. The participant 101 may either use data presentation system 230 to modify the parameters of the bet with the betting agency 102, or may manually modify the parameters of the bet using a betting form or the like. For example, an input device of the data presentation system 230 may be used to modify the parameters of the bet. The modified parameters 290 are then transferred to the betting agency 102 whilst the event 201 is in progress.

In one embodiment, the participant 101 may modify the parameters of the bet by refining the selected potential outcomes of the bet. For example, the participant 101 initially places a bet with the betting agency 102 for a box trifecta including seven potential horses. At the midpoint stage of the horserace, two of the horses are lagging in the race, as indicated by the event data 275 presented to the participant 101 using the data presentation system 230. As such, the participant 101 refines the selected number of potential outcomes by reducing the number of selected potential outcomes from seven horses to five horses. Therefore, the bet continues as a box trifecta including five horses which may potentially finish first, second and third in the horserace. This allows the participant 101 to make an educated assessment based on the event data 275 presented during the progress of the event 201 in order to increase the likelihood of winning the bet and/or increase the winnings of the bet.

In an additional or alternative embodiment, the participant 101 may modify the parameters of the bet by redistributing at least some of the amount wagered in relation to one of the selected potential outcomes, to a different potential outcome. For example, the participant initially places three bets on three horses to win a horserace. The participant places $10 on each horse to win. At the midpoint of the horserace, the event data 275 indicates to the participant 101 that one of the horses is lagging in the race. As such, the participant 101 equally redistributes $8 of the initial $10 from the lagging horse to the other two horses in the event 201. As such, when the parameters of the bet are finalised with the betting agency 102, the participant 101 has one bet of $2 on one horse to win, and two other bets of $14 for the two other horses to win. As such, the participant 101 can use the event data 275 to make an educated assessment to redistribute the wagered amount on one or more outcomes which are more likely to occur in the event 201 based on the event data 275 presented by the data presentation system 230.

At step 510, a deadline by which the participant 101 can no longer modify the parameters of the bet occurs. The participant 101, prior to this deadline, may modify the parameters of the bet for at least one of between two points of time whilst the event 201 is in progress, before a predetermined time whilst the event 201 is in progress, before a predetermined distance has been completed by one or more objects 250 in an event 201, whilst the event 201 is in progress, or before an indicative point related to the nature of event 201 in progress.

At step 520, the event 201 finishes. At step 530, the participant 101 collects any winnings from the bet made with the betting agency 102. This may be performed in the normal manner where either the receipt of the bet placed is processed by the betting agency 102 in order to determine the amount of winnings that the participant 101 has won, or the betting agency 102 determines the amount of winnings and deposits this amount into the account of the participant 101.

Variations

Alternatively to step 410 where the data processing system 220 transfers a request to the measurement devices 210 associated with the objects 250 competing in the event 201, the measurement device 210 may be configured to periodically measure and transfer object data 260 to the data processing system 220 without requiring request data 260 to be received from the data processing system 220. Using this configuration, the data processing system 220 may selectively ignore object data 260 received from the measurement device 210 prior to the commencement and after the completion of the event 201.

In another embodiment, the participant 101 may define one or more rules for determining if and how the parameters of the bet should be modified in accordance with the event data 275. For example, when the bet is initially placed, the participant may select seven horses for a box trifecta and define a rule where the two lowest placed horses at the midpoint of the race should be removed from the bet. This rule may be defined using the data presentation system 230 which the participant 101 uses to initially place the bet, or the rule may be defined selected using a betting form which is processed by the betting agency 102. When the midpoint of the race arrives, the rule is automatically applied by either the betting agency 102 or the data presentation system 230 such that the parameters of the bet are modified according to the defined rule. Therefore, this option eliminates the need for the participant 101 to ensure that the modified parameters of the bet 290 are transferred to the betting agency 102 before the deadline.

It will be appreciated that the participant 101 may be able to modify the parameters of the bet a number of times during the progress of the event 201, up to the deadline.

In another variation, the event 201 may be a computer simulated event, such as a simulated horse racing event. The participant 101 may place a bet initially before the simulated event begins. When the event begins, event data 275 is transferred to the data presentation system 230 which is used by the participant to assess the progress of the event 201. The data presentation system 220 may generate simulated graphical data based on the event data 275. The participant 101 may then use the data presentation system to modify the parameters of the bet, and the modified parameters 290 are then transferred to the betting agency 102. It will be appreciated that in tie embodiment, as well as other embodiments discussed, the data presentation system may be a personal computer of the participant 101. Alternatively, the data presentation system 230 may be a television, and the participant 101 may use a computer system to place the bet and modify the parameters of the bet.

In yet a further variation, the participant 101 may use a betting form to select the amount to wager and the potential outcomes of the event. The betting form is then processed by the betting agency 102 in order to place the bet.

In another modification, the participant 101 may select the amount to be wagered from an account system. The participant 101 may access the account using an identity and at least one of a password and a signature of the participant 101.

In one embodiment, the event 201 may be a race including competing objects 250. As such, some of the potential outcomes of the bet which the participant 101 may select include selecting an object 250 that places first in the race, selecting three objects 250 in any order that place first, second and third in the race, selecting a first object 250 that finishes first in the race, a second object 250 that finishes second in the race and a third object 250 that finishes third in the race, and selecting where an object 250 finishes in the race. Furthermore, the participant 101 may select a combination of outcomes of the event 201 for the bet.

In the case where the event 201 is a race over a form of racetrack, the data processing system 220 may include, a plurality of transmitters and receivers (or transceivers) 223 positioned on the racetrack. The plurality of transmitters and receivers, also referred to as surface-located devices, may be dispersed along the racetrack. As such, the data processing system 220 is configured to transmit or receive, using one or more of the plurality of transceivers 223, the request data 270 or object data 260 to or from the measurement devices 210 associated with the objects 250 competing in the event 201. This allows the data processing system 220 to utilise a lower power radio transmission such the data processing system 220 can selectively control one or more transceivers 223 which may be located closer to one of the measurement devices 210 associated with an object 250 competing on the racetrack. For other types of events, other than racing, the surface-located device may be located over the playing surface which the competing objects are competing upon.

In one embodiment, the request data 270 may be encrypted by the data processing system 220, and the encrypted request data 270 is sent to the measurement devices 210. In another variation, the object data 260 may be encrypted by the measurement device 210, and the encrypted object data 260 is then transferred to the data processing system 220.

In another modification, the data processing system 220 may periodically transfer the request data 270 to one or more measurement devices 210. For example, for a horserace, it may be appropriate to transfer request data every 80 milliseconds. The period may be selectively configured by the betting agency 102.

In one form of the method 100 and system 200, the object competing in the event 201 carries the measurement device 210 for receiving the request data 270, measuring the object data 260, and transferring the object data 260 to the data processing system 220. The measurement device 210 may generally be a portable processing system, such as a data logger. The device may also be able to generate object data 260 using measured values, as discussed earlier.

In one specific example, in the case of a horse race, the measurement device 210 may be carried with the horse competing in the horse racing event. In one embodiment, the measurement device 210 may be included in a cap of a jockey riding the horse in the event. In an alternative embodiment, the measurement device 210 may be included in a bridle of the horse in the event. As official finishing times of horses are typically based on when the head of the horse has crossed the finish line, the object data 260 may need to be corrected by the data processing system 230 due to where the measurement device 210 is carried on the horse. Although this example has been described with reference to horses, this embodiment can equally be applied for other objects 250 competing in an event 201.

In another variation, the measurement device 210 may associate and transfer time stamps with the object data 260, such that the data processing system 260 can generate the event data 280 using object data 260 recorded at similar or the same times during the event 201.

The event data 275 and modified set of odds 280 may be encrypted by the data processing system 220, and the data presentation system 230 may include a decrypting mechanism in which to decrypt the event data 275 and the modified set of odds 280. The transceiver 223 of the data processing system 220 used to transfer request data 270 to the measurement devices 210 may also be used to transfer the event data 275 and the modified set of odds 280 to the data presentation system 230. Alternatively, a second transmitting mechanism may be used to transmit the event data 275 and modified set of odds 280.

In one embodiment, the data presentation system 230 selects, according to an availability of one or more output interfaces 236 of the data presentation system 230, an output medium which the event data 275 is to be presented to the participant 101. Once an output medium has been selected, the data presentation system 230 can format, manipulate, or modify the event data 275 in accordance with the output medium selected. The data presentation system 230 may also generate presentation data based on the event data 275, and the presentation data, which represents the event data 275, is presented to the participant 101.

In one example, the data presentation system 230 or the data processing system 220 may modify the event data to include graphical indicia. In one example the graphical indicia may represent the deadline when no more modifications to parameters of the bet can occur. For example, in a horse race, the deadline to finalise the parameters of the bet may be five-hundred meters from the finish line. As such, the data processing system 220 or the data presentation system 230 modifies the event data 275 to include a graphical indicator representing a location five-hundred meters before the finishing line such that a participant 101 is visually aware of the imminent deadline.

In another embodiment, the participant 101 may configure the data presentation system 230 to present a subset of the event data 275. For example, in a horserace, the participant 101 may only be interested in receiving event data 275 for seven horses in the field racing. As such, the data presentation system 230 is configured to present the event data 275 which corresponds to the subset of the seven horses which the participant 101 is interested in receiving.

In another modification, if a betting form was initially used to place the bet prior to the commencement of the event 201, the initial betting form may be used to modify the parameters of the bet. This may include the processed betting form having a region which the participant can mark to indicate the modified parameters 290 of the bet. The processed betting form can then be reprocessed to finalise the parameters of the bet with the betting agency 102. Additionally, or alternatively, a second form may be used by the participant to indicate the modified parameters 290 of the bet, wherein the second betting form is processed by the betting agency 102.

In one embodiment, the receipt which the participant 101 receives includes an identity of the bet. When the participant 101 wishes to modify the parameters of the bet, the participant 101 may be required to use the identity of the bet included on the receipt to modify the parameters of the bet. If the participant 101 is using the data presentation system 230 to modify the parameters of the bet, an identity of the participant and a password and/or signature of the participant 101 may also be required to verify the modification to the parameters of the bet. The participant 101 may receive a further receipt when the participant 101 modifies the parameters of the bet.

In another variation, the bet placed by the participant 101 with the betting agency 102 may be in the form of a "margin" bet, wherein the bet is placed in relation to one or more margins or differences in distance, times, or scores between objects 250 in the event. For example, in a horse racing event, a bet may have initially been placed, prior to the commencement of the event 201, in relation to "horse A" finishing the horse race over "horse B" by a margin of 2 lengths. During the progress of the event 201, the event data 275 presented to the participant 101 indicates that "horse A" is beginning to perform well and "horse B" is beginning to perform badly. As such, in order to increase the winnings of the bet, the participant 101 modifies the parameters of the bet by increasing the margin of that "horse A" beats "horse B". Although this example has been described in relation to horse racing, margin betting can be used in other forms of events 201, for example tennis, where "player A" wins by a particular number of games over "player B", or in swimming, where "swimmer A" wins by a particular number of seconds over "swimmer B".

In another variation, the betting agency may charge a fee for allowing the participant to modify parameters of the bet during the progress of the event.

Although the present invention has been described in terms of the presently preferred embodiments, it is to be understood that the disclosure is not to be interpreted as limiting. Various alterations and modifications will no doubt become apparent to those skilled in the art after having read the above disclosure. All such alterations and modifications should be considered within the spirit and scope of the invention as broadly herein before described.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Claims further defining the invention are as follows:

1. A method for a betting agency to accept a bet from a participant in relation to a race having competing objects, the betting agency being associated with a data processing system, comprising:

receiving, at the data processing system, a bet from the participant wagering an amount in relation to one or more selected potential outcomes from potential outcomes of the race;

obtaining, at the data processing system from one or more measurement devices, object data indicative of performance of the competing objects in the race;

calculating, by the processing system, modified betting odds for the potential outcomes during the race based at least partially upon the object data;

receiving, at the data processing system from the participant, an indication of one or more modifications to at least one of the amount wagered and the one or more selected potential outcomes of the bet during progress of the race; and modifying, by the data processing system, at least one of the amount wagered and the one or more selected potential outcomes of the bet in accordance with the received indication and the modified betting odds after commencement of the race and prior to completion of the race, wherein the modifying of the at least one of the amount wagered and the one or more selected potential outcomes of the bet includes, refining the one or more selected potential outcomes of the bet, and redistributing at least some of the amount wagered in relation to at least one of the selected potential outcomes of the bet.

2. The method according to claim 1, wherein the refining the one or more selected potential outcomes of the bet includes reducing the number of the one or more selected potential outcomes.

3. The method according to claim 1, wherein the method includes modifying the at least one of the amount wagered and the one or more selected potential outcomes of the bet according to one or more conditions including at least one of, between two points of time whilst the race is in progress;

before a point in time whilst the race is in progress;

before or after a distance has been completed by one of the competing objects in the race, whilst the race is in progress; and before or after an indicative point related to a nature of the race in progress.

4. The method according to claim 1, wherein the race is one of, a horse race; and a computer simulated event.

5. The method of claim 1, wherein no new bets are placed during the race.

6. The method according to claim 1, wherein the method includes modifying, by the data processing system, the amount wagered and the one or more selected potential outcomes of the bet in accordance with the received findication after commencement of the race and prior to completion of the race.

7. The method according to claim 1, wherein the one or more selected potential outcomes for the race include at least one of, one of the competing objects that places first in the race;

three of the competing objects in any order that place first, second and third in the race;

two of the competing objects that places first and second in the race;

a first competing object that places first in the race, a second competing object that places second in the race, and a third competing object that places third in the race; and a placing of one of the competing objects in the race.

8. A data processing system configured to accept a bet from a participant in relation to a race having competing objects, wherein the data processing system is associated with a betting agency, wherein the data processing system is configured to:

receive a bet from the participant wagering an amount in relation to one or more selected potential outcomes from potential outcomes of the race;

obtain, at the data processing system from one or more measurement devices, object data indicative of performance of the competing objects in the race;

calculate, by the processing system, modified betting odds for the potential outcomes during the race based at least partially upon the object data;

receive, from the participant, an indication of one or more modifications to at least one of the amount wagered and the one or more selected potential outcomes of the bet during progress of the race; and modify at least one of the amount wagered and the one or more selected potential outcomes of the bet in accordance with the received indication and the modified betting odds after commencement of the race and prior to completion of the race, wherein The data processing system is configured to modify the at least one of the amount wagered and the one or more selected potential outcomes of the bet by, relining the one or more selected potential outcomes of the bet, and redistributing at least some of the amount wagered in relation to at least one of the selected potential outcomes of the bet.

9. The data processing system according to claim 8, wherein in order to refine the selected potential outcomes of the bet, the data processing system is configured to reduce the number of selected potential outcomes.

10. The data processing system according to claim 8, wherein the data processing system is configured to modify the at least one of the amount wagered and the one or more selected potential outcomes of the bet according to one or more conditions including at least one of, between two points of time whilst the race is in progress;

before a point in time whilst the race is in progress;

before or after a predetermined distance has been completed by one of the competing objects in the race, whilst the race is in progress; and before or after an indicative point related to a nature of the race in progress.

11. The data processing system according to claim 8, wherein the race is one of, a horse race; and a computer simulated event.

12. The data processing system of claim 8, wherein no new bets are placed during the race.

13. The data processing system according to claim 8, wherein the data processing system is configured to modify the amount wagered and the one or more selected potential outcomes of the bet in accordance with the received indication after commencement of the race and prior to completion of the race.

14. The data processing system according to claim 8, wherein the one or more selected potential outcomes for the race include at least one of, one of the competing objects that places first in the race;

three of the competing objects in any order that place first, second and third in the race;

two of the competing objects that place first and second in the race;

a first competing object that places first in the race, a second competing object that places second in the race, and a third competing object that places third in the race; and a placing of one of the competing objects in the race.

15. A system for a betting agency to accept a bet from a participant in regard to an event having a plurality of competing objects, comprising:

one or more measurement devices configured to, measure the performance of the competing objects in the event;

generate object data indicative of performance of the competing objects; and transfer the object data; and a data processing system associated with the betting agency, the data processing system being configured to, receive the bet from the participant wagering an amount in relation to one or more selected potential outcomes from potential outcomes of the event;

receive the object data from the one or more measurement devices;

calculate, based at least partially upon the received object data, modified betting odds for potential outcomes during the event;

receive, from the participant during the progress of the event, an indication of one or more modifications to at least one of the amount wagered and the one or more selected potential outcomes of the bet; and modify at least one of the amount wagered and the one or more selected potential outcomes of the bet in accordance with the received indication and the modified betting odds after commencement of the event and prior to completion of the event, wherein The data processing system is configured to modify the at least one of the amount wagered and the one or more selected potential outcomes of the bet by, refining the one or more selected potential outcomes of the bet, and redistributing at least some of the amount wagered in relation to at least one of the selected potential outcomes of the bet.

16. The system according to claim 15, wherein the one or more measurement devices arc configured to generate the object data indicative of at least one of, a location or place of one of the competing objects in the event;

a velocity of one of the competing objects in the event;

a time of completion of a distance by one of the competing objects of the event;

an acceleration of one of the competing objects of the event;

weather conditions of the event;

a time between one of the competing objects and another one of the competing objects in the event; and a distance between one of the competing objects and another one of the competing objects in the event.

17. The system according to claim 15, the system includes a plurality of surface-positioned devices, wherein each surface-defining device is configured to, receive the object data from one or more measurement devices; and transfer the object data to the data processing system.

18. The system according to claim 15, wherein the data processing system is configured to calculate the modified betting odds based at least partially upon at least one of, the amount wagered by other participants with the betting agency;

past event data indicative of one or more past events;

past object data indicative of one or more performances by one or more of the competing objects; and a profit margin for the betting agency.

19. The system according to claim 15, wherein the system includes a participant processing system in data communication with the data processing system, wherein the participant processing system is configured to, receive, from the participant, input data indicative of the indication of the one or more modifications to the at least one of the amount wagered and the one or more selected potential outcomes of the bet; and transfer the input data to the data processing system.

20. The system according to claim 15, wherein the system includes a plurality of measurement devices, each measurement device being carried by a respective one of the competing objects, wherein each measurement device includes a transmitter.

21. The system according to claim 15, wherein the event is one of, a horse race; and a computer simulated event.

22. The system according to claim 20, wherein the event is a horse racing event and wherein each measurement device is provided in a form of a bridle which is associated with a respective horse in the horse racing event.

23. The system according to claim 15, wherein the data processing system is configured to receive the indication of the one or more modifications to the at least one of the amount wagered and the one or more selected potential outcomes during progress of the event.

24. The system of claim 15, wherein no new bets are placed during the event.

25. The system according to claim 15, wherein the data processing system is configured to modify the amount wagered and the one or more selected potential outcomes of the bet in accordance with the received indication after commencement of the event and prior to completion of the event.

26. A method for a betting agency to accept a bet from a participant in relation to a race having competing objects, the betting agency being associated with a data processing system, comprising:

receiving, at the data processing system, a bet from the participant wagering an amount in relation to one or more selected potential outcomes from potential outcomes of the race;

obtaining, at the data processing system from one or more measurement devices, object data indicative of performance of the competing objects in the race;

calculating, by the processing system based at least partially upon the object data, modified betting odds for the potential outcomes during the race;

receiving, at the data processing system from the participant, an indication of one or more modifications to at least one of the amount wagered and the one or more selected potential outcomes of the bet during progress of the race; and modifying, by the data processing system, the amount wagered and the one or more selected potential outcomes of the bet in accordance with the received indication and the modified betting odds after commencement of the race and prior to completion of the race.

27. A data processing system configured to accept a bet from a participant in relation to a race having competing objects, wherein the data processing system is associated with a betting agency, wherein the data processing system is configured to:

receive a bet from the participant wagering an amount in relation to one or more selected potential outcomes from potential outcomes of the race;

obtain, at the data processing system from one or more measurement devices, object data indicative of performance of the competing objects in the race;

calculate, based at least partially upon the received object data and past event data indicative of one or more past events, modified betting odds for potential outcomes during the race;

receive, from the participant, an indication of one or more modifications to at least one of the amount wagered and the one or more selected potential outcomes of the bet during progress of the race; and modify at least one of the amount wagered and the one or more selected potential outcomes of the bet in accordance with the received indication and the modified betting odds after commencement of the race and prior to completion of the race.

* * * * *